UNITED STATES PATENT OFFICE.

SALLIE BOYKIN, OF GADSDEN, TENNESSEE.

PROCESS FOR MAKING BUTTER.

No. 796,892.  Specification of Letters Patent.  Patented Aug. 8, 1905.

Application filed April 3, 1905. Serial No. 253,582.

*To all whom it may concern:*

Be it known that I, SALLIE BOYKIN, a citizen of the United States, residing at Gadsden, in the county of Crockett and State of Tennessee, have invented certain new and useful Improvements in Processes for Making Butter; and I do declare the following to be a full, clear, and exact description of the invention, such as will enable others skilled in the art to which it appertains to make and use the same.

My invention is a process of making a superior quality of butter directly from fresh cream without the necessity of churning the same, as hereinafter described and claimed.

In carrying out my process I take freshly-drawn sweet milk, strain it into shallow vessels, and set the vessels aside a sufficient length of time to cool the milk and cause the cream to rise to the surface. Then without disturbing the cream the vessels containing the milk and cream are placed on a stove or otherwise heated until the cream is brought to the boiling-point. The vessels are then set aside and cooled, and when the milk has become thoroughly cooled, which cooling may be accelerated by placing saturated cloths over the vessels and setting them in a current of cool air, the cream will be found to have formed a thick crust on top of the milk and to contain every particle of the fatty matter which was in the milk. Any means may be employed for cooling the milk after it has been heated, and I do not limit myself in this particular. Having thus cooled the milk and caused the cream to form thereon, I remove the thickened cream and place the same in a suitable vessel, and to every pint of cream add two teaspoonfuls of white granulated sugar if the weather be cool and one teaspoonful if the weather be warm. The cream, with the sugar therein, is then gently stirred to cause the sugar to be quickly distributed in the cream, and the latter is then set aside in a suitable place where the atmosphere is from 62° to 70° until fermentation ensues, which will be usually in about an hour. If it be desired to cause the cream to ferment in a shorter time, this may be accomplished by adding about one-half teaspoonful of vinegar to each pint of cream. When the cream has reached the right stage for making the butter, it will be thick and will present a "puffy" appearance. The cream is then "worked" with a butter-paddle to solidify the same, which operation usually takes only about a minute. Salt is then added, and the butter is finally washed. If the washing takes out too much of the salt, the butter may be resalted after washing to suit the taste. The salting and washing of the butter take every particle of the sugar and vinegar therefrom, leaving the product fresh, pure, and sweet butter which is firm in texture and of a rich golden color.

It will be understood that my improved process is adapted for speedily producing entirely sweet butter from fresh milk, avoiding the use of sour cream in making the butter, and also entirely avoiding the usual operation of churning the butter, which is both laborious and expensive.

My improved process may be carried out in an exceedingly short space of time. As a matter of fact, in my improved process when the cream has arrived at the right stage I have been enabled to make butter therefrom in from one-quarter of a minute to a minute.

Having thus described my invention, what I claim as new, and desire to secure by Letters Patent, is—

1. The herein-described process of making butter, consisting in permitting cream to rise to the surface of milk, heating the milk and cream to the boiling-point, cooling the same, removing the cream from the milk, causing the cream to ferment, and finally solidifying the same.

2. The herein-described process of making butter, consisting in permitting cream to form on the surface of milk, heating the milk and cream to the boiling-point, cooling the same, removing the cream from the milk, causing the cream to ferment, working the butter to solidify it, and salting and washing the butter.

In testimony whereof I have hereunto set my hand in presence of two subscribing witnesses.

SALLIE BOYKIN.

Witnesses:
 HENRY SIMS,
 BOYKIN LYNN.